Nov. 8, 1938.          C. J. HUGHEY                    2,135,817
                  FILM HANDLING APPARATUS
                   Filed Oct. 2, 1937          4 Sheets-Sheet 1
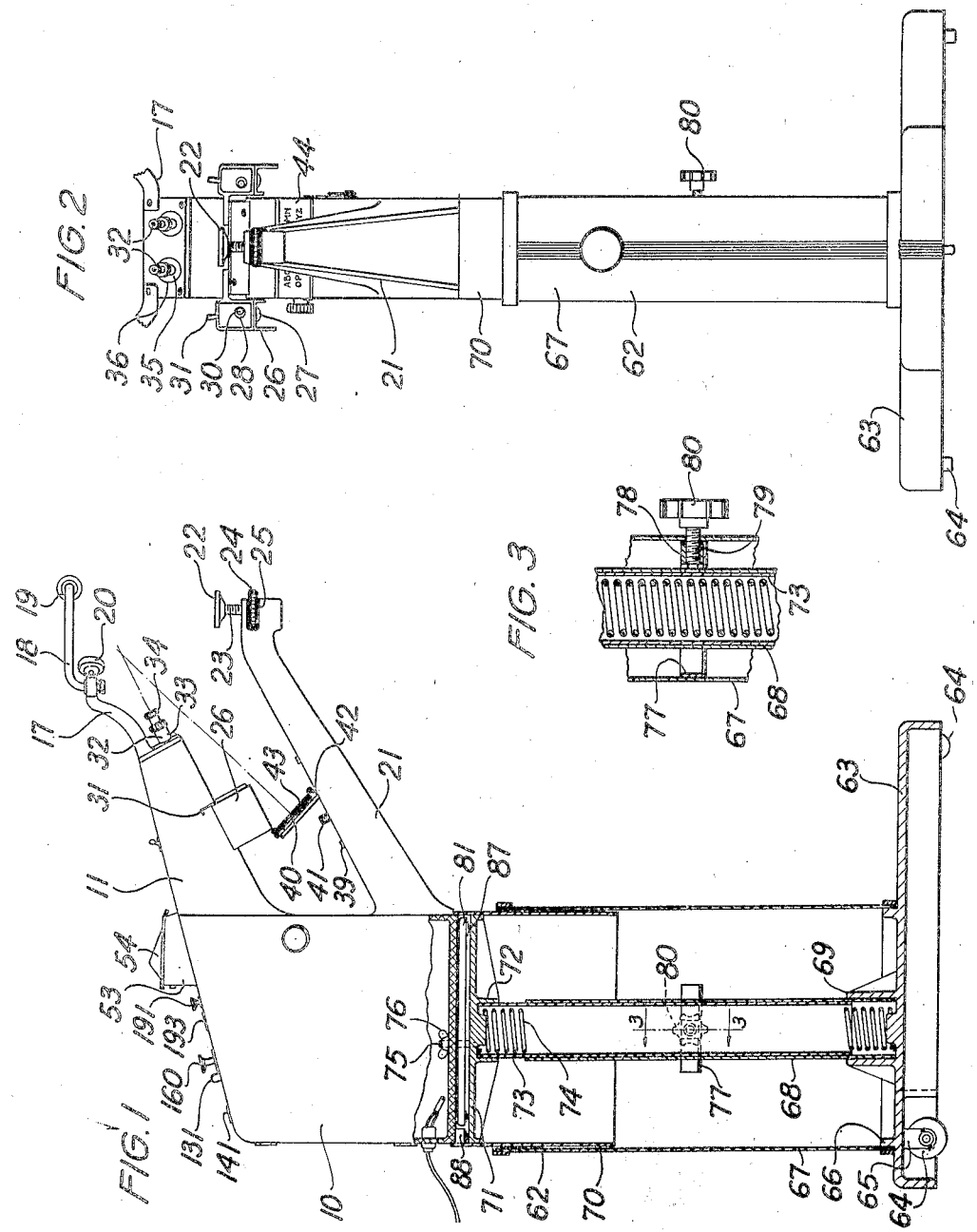
Carter J. Hughey
INVENTOR
BY
ATTORNEYS

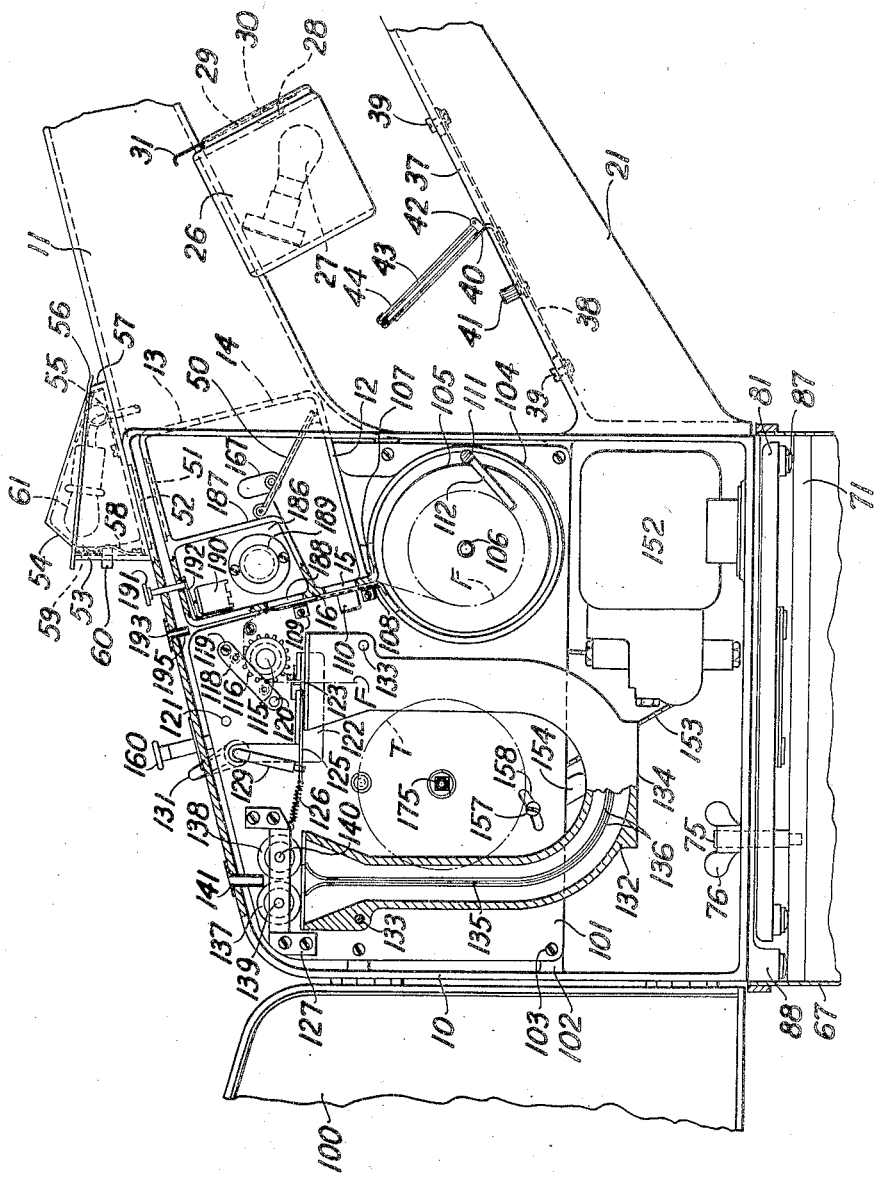

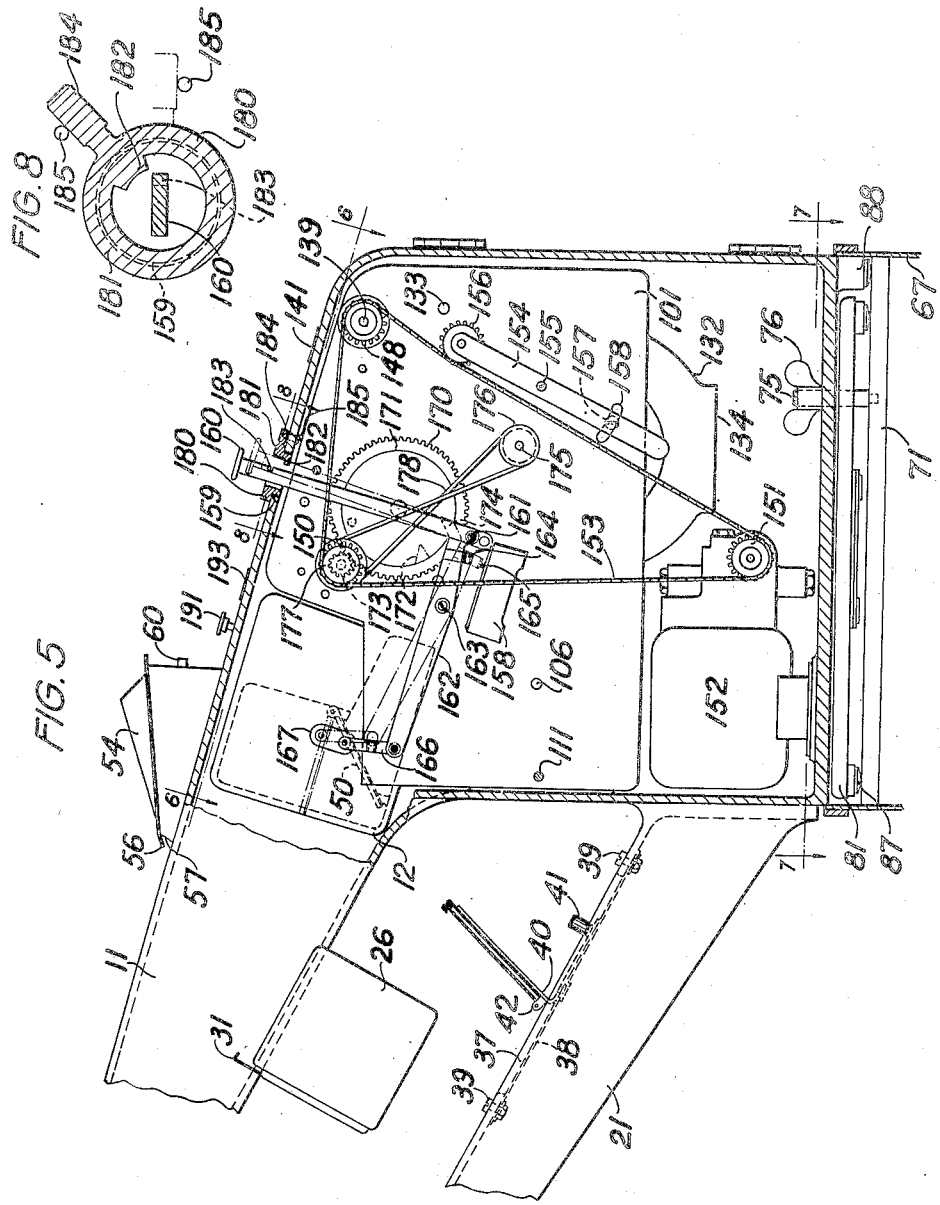

Nov. 8, 1938.  C. J. HUGHEY  2,135,817
FILM HANDLING APPARATUS
Filed Oct. 2, 1937  4 Sheets-Sheet 4
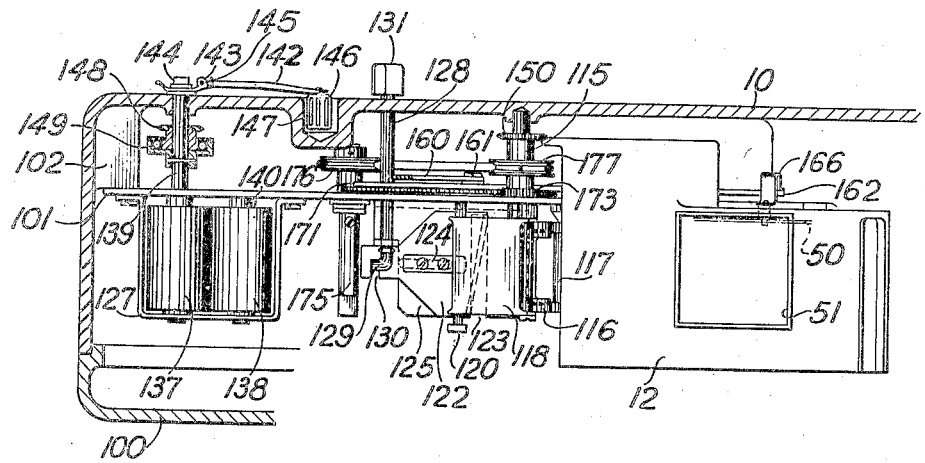

Patented Nov. 8, 1938

2,135,817

UNITED STATES PATENT OFFICE 2,135,817

FILM HANDLING APPARATUS

Carter J. Hughey, Rochester, N. Y., assignor to Eastman Kodak Company, Rochester, N. Y., a corporation of New Jersey Application October 2, 1937, Serial No. 167,010

14 Claims. (Cl. 95—13)

The present invention relates to an apparatus for photographically recording the movement of the eyes, commonly used by optometrists, and particularly to the film feeding and handling apparatus associated therewith.

In previous apparatus of this type the film strip was fed from a supply reel past the exposure aperture and directly to a takeup reel which would hold the same quantity of film as would the supply reel. After the supply of film had been exposed, the takeup reel was then transported to a dark room where the film was processed. Inasmuch as the supply reel of film contains enough film to take many individual records, it was not practical or possible to make one individual record and remove the same to a dark room for processing immediately without fogging and wasting a considerable quantity or all of the film remaining on the supply reel. Hence, in solving the problem of being able, with an apparatus of the type described, to make an individual record and deliver it processed while the subject waits, and also take a plurality of records and collect them for future processing, the present invention was conceived.

One object of the present invention is the provision in an apparatus of the type described of means for processing the film immediately after it is exposed. Another object is the provision of a treating tank which is located in the path of the film strip and through which the film strip is fed by the same means which moves it past the exposure opening. Still another object is the provision of a timing mechanism which is connected to the film feeding means so that after starting, the machine will continue to run until a given length of film has been fed through the treating tank after which the film feed will automatically stop. And yet another object is the provision of means for cutting the film strip entering the treating tank and means for manually removing said severed film strip from the treating tank. A further object is the provision of means for alternately cutting off the light rays directed toward the exposure aperture and permitting said rays to pass through the exposure aperture, said means being connected to the control lever for the film feeding apparatus so that the light rays are only permitted to pass through the exposure aperture when the film is being moved past the exposure aperture. Another object is the provision of means whereby a takeup reel can be inserted in the apparatus in place of the treating tank so that a plurality of individual records can be made on a single film strip for future processing. And yet another object is the provision of means whereby the timing mechanism for the film feed can be disconnected to permit of making records of any length at the choice of the operator.

The novel features that I consider characteristic of my invention are set forth with particularity in the appended claims. The invention itself, however, both as to its organization and its methods of operation, together with additional objects and advantages thereof, will best be understood from the following description of specific embodiments when read in conjunction with the accompanying drawings in which, Fig. 1 is a side view, partly in section and partly in elevation, of the apparatus mounted on an adjustable, portable carriage, and showing the manner of adjusting the carriage, Fig. 2 is an end elevation of the apparatus and carriage shown in Fig. 1, Fig. 3 is a section taken on line 3—3 of Fig. 1 and showing in detail the clamping means for the adjustable carriage, Fig. 4 is a side elevation of that portion of the apparatus housing the film handling and exposing apparatus, with the door open to show said film handling apparatus, Fig. 5 is a side view of the same portion of the device as is shown in Fig. 4, but taken from the other side thereof, with the casing removed to show the driving mechanism for the film handling apparatus, Fig. 6 is a section taken on line 6—6 of Fig. 5, Fig. 7 is a section taken on line 7—7 of Fig. 5, and showing the foldable support by means of which the apparatus may be supported on a table or the like exclusive of the portable carriage, Fig. 8 is a section taken on line 8—8 of Fig. 5 showing in detail the catch member for holding the actuating mechanism out of engagement with the timing mechanism. In this figure the catch member is shown rotated to its inoperative position while in Fig. 5 it is shown in its operative position.

Referring now to the drawings wherein a preferred embodiment of my invention is shown, and particularly to Figs. 1, 2, 3, 4 and 5, the apparatus comprises a light tight casing 10 the forwardly extending portion 11 of which constitutes a light tunnel for the purpose hereinafter described. Between the casing 10 proper and the light tunnel 11 thereof is situated a chamber 12 one end wall 13 of which is provided with an opening 14 through which light rays passing through the tunnel may pass to and through an exposure aperture 15 formed in the other end wall 16 of the chamber.

To the end of the light tunnel 11 is fastened a square ended bracket 17 on opposite sides of which is pivotally mounted an arm 18 having a pad 19 on the end thereof. Also mounted on the square end of bracket 17 and spaced apart is another pair of pads 20 which in conjunction with pad 19 forms a part of a headrest for holding the head of the person the movement of whose eyes are to be photographed. On the end of the U-shaped extension 21, extending from the bottom of the casing 10, is a chin rest 22 which in combination with the pads 19 and 20 form the complete headrest. The chin rest 22 can be made vertically adjustable in any suitable manner so as to adapt the headrest for different length heads, and for the purpose of illustration said chin rest is shown as comprising a threaded member 23 which is moved by a nut member 24 which is rotatably mounted in a slot 25 in the end of the extension 21. The person whose eyes are to be recorded rests his chin on the chin rest 22, and his forehead on the pad 20, and the arms 18 are moved inwardly until the pads 19 thereon engage the head at the temples. So that the pads 19 and 20 will take a position which fits the contour of the head, they may be adjustably mounted on the arms 18 and bracket 17 respectively such as by means of ball and socket joints.

On either side of the light tunnel 11 is located a lamphouse 26 within which a lamp 27 is mounted, see Figs. 1, 2, and 4. The end of each lamphouse toward the headrest is provided with an aperture 28 through which light rays from the lamp may strike the pupils of the person's eyes whose head is in the headrest. In order to properly locate the beam of light emanating from the lamp-housing 26 so that they will be directed to the eyes, an adjustable aperture slide member 29 may be frictionally held in position behind the front of each lamphouse so that the aperture 30 therein, which is smaller than the aperture 28 in the lamphouse, may be shifted relative to the aperture 28 by means of a handle 31 extending to the outside of the lamphouse through a slot therein, see Figs. 2 and 4.

The light beams from the lamphouses 26 upon striking the pupils of the eyes are reflected through lens tubes 32 which direct said light beams through the light tunnel 11 and through the exposure aperture 15. These lens tubes 32 serve the same purpose in this apparatus as do objectives on cameras, with the exception that they merely direct a beam of light to the exposure aperture while a camera objective projects a complete image through the exposure aperture. Each lens tube 32 includes an outside stationary tube 33 within which a tube 34 carrying the lens is slidably mounted for the purpose of focusing the beam of light on a film strip passing the exposure aperture. The lens tubes 32 as a whole can be mounted on the end of the light tunnel 11 in any suitable manner so that the space between them can be adjusted to correspond to the spacing of the subject's eyes, and one way of accomplishing this is to mount each of the lens tubes eccentrically on a disk 35 which disk is frictionally held in position between the front of the light tunnel 11 and a plate spaced therebehind. The hole 36 in the end of a light tunnel through which the lens tubes extend must be of sufficient size to permit the amount of adjustment provided by the eccentric mounting of each lens tube on its respective disk 35. Since this type of adjustment described forms no part of the present invention, no detailed showing of the same is deemed necessary, and the general showing of the same in the drawings along with the description thereof herein given is deemed sufficient to be understandable to one skilled in the art.

The extension 21 is provided with a slot 37 beneath which is mounted a slotted track member 38 by means of screws 39. Slidably mounted on this tract member through pin and slot connections is a standard 40 connected to which is a handle 41 for adjusting the standard along the track. To spaced bearings 42 on the lower end of the standard are pivotally mounted a plurality of card receiving frames 43 for positioning printed cards 44 which the subject is to read. The inside lower corner of each lamphouse 26 is cut away so that the light from the lamp therein will serve to illuminate the card on the standard 40. As the subject reads the printed matter on the card positioned on the standard, the movement of the pupil of the eye causes the light reflected therefrom through the lens tube to move, and this movement is recorded on a film, as will be hereinafter described, from which it can be determined as to whether the subject reads correctly or incorrectly.

Pivotally mounted in the chamber 12 is a mirror 50 which may move between a position wherein it intercepts the two light beams emanating from the lens tubes 32 and reflects them through an aperture 51 in the top of the chamber and onto a ground glass 52 in the top of the light tunnel 11, see Fig. 4; and a position wherein it allows said light beams to pass through the exposure aperture 15, see broken line position, Fig. 5. The ground glass 52 is provided for the purpose of focusing the two light beams so that they will be sharp when projected onto a film strip at the exposure aperture, and also for the purpose of locating said beams so that they will be located on said film strip properly. Surrounding the ground glass is a housing 53 to one corner of which is pivoted a cover 54 which is normally spring pressed to its open position by spring 55. The projection 56 on the rear edge of the cover is adapted to engage the rear wall 57 of the housing to limit the upward movement of the cover. The cover is held in its closed position by a spring catch 58 mounted on the front wall of the housing, said spring catch being adapted to snap into a slotted catch member 59 carried by the cover. A releasing pin 60 attached to the spring catch 58 and extending through an aperture in the front wall of the housing provides the means for releasing the catch and permitting the cover to open, see Fig. 4. A lamp 61 may be carried on the under side of the cover and be connected so as to light only when the cover is in its closed position whereby the light rays therefrom will be directed by the mirror 50 through the lens tube 32 as beams of light. These light beams can be used to roughly locate the lens tubes 32 relative to the subject's eye by watching for the reflections of the light beams passing therethrough on the pupil of the eye. After the lens tubes have been roughly located in this manner, the cover 54 of the housing is raised, wherein the lamp 61 goes out, and the points of light appearing on the ground glass and formed by the reflections of light from the pupils of the eyes can be properly and finally located on said ground glass by further adjustment of the lens tubes to insure the images being properly placed on the film strip passing the exposure aperture. Lamps 27 in the lamphousing 26, and the lamp 61 in the housing 53 are so connected into the main circuit of the apparatus that when the cover 54 of the housing 53 is closed and the lamp 61 therein is on, lamps 27 are turned off; and when the cover 54 of the housing is raised and the lamp 61 is turned off, lamps 27 in the lamphouses 26 are turned on.

The casing 10 and its associated parts may be supported on a vertically adjustable portable carriage, as shown in Figs. 1 and 2, and indicated broadly as 62. This carriage comprises a T-shaped base 63 which is movably supported by wheels 64 rotatably mounted in bearings 65 extending from the under side of the base. Surrounding a flange 66 on the top of the base 63 is a hollow, rectangular pillar 67 up through the center of which extends a tube member 68 mounted in a well 69 formed on top of the base. In telescoping relation with the pillar 67 is another hollow, rectangular section 70 within, and located slightly below the upper edge of which, is fixed a supporting plate 71 on which the casing 10 is adapted to rest, see Fig. 1, so as to give the appearance of being an integral part of the carriage 62, see Fig. 2. In a well 72 on the under side of the supporting plate 71 is positioned a tube 73 which telescopes with the tube 68 projecting upward from the base 63. Positioned between the supporting plates 71 and the base 63 within the tubes 68 and 73 is a coil spring 74 which serves to counter-balance the combined weight of the pillar 70 and the casing 10 supported thereby to facilitate the vertical adjustment of the casing 10 relative to the base 63. The casing 10 may be removably fastened to the supporting plate 71 by means of a bolt 75 fixed to the supporting plate 71 and which extends through an aperture in the bottom of the casing 10 and receives a wing nut 76. Referring now to Fig. 3 wherein the means for clamping the portable carriage 62 in any desired position of a relative adjustment is shown, a channel piece 77 is located in the pillar 67 and is perforated to permit telescoping tubes 68 and 73 to extend therethrough. In this channel piece between the telescoping tubes and one side wall of the pillar 67 is fixed a threaded sleeve 78 in threaded engagement with which is a clamping bolt 79 one end of which passes through an aperture in the telescoping tube 68 to engage the tube 73 and the other end of which is provided with a hand wheel 80. It will be readily understood from Fig. 3, that when the hand wheel is turned in one direction the bolt 79 is removed from engagement with the tube 73 to permit its adjustment relative to the stationary tube 68, while when the bolt 79 is turned in the opposite direction the tube 73 is frictionally engaged by the end thereof and is prevented from movement relative to tube 68.

To allow the casing 10 to be mounted on a table separate from the carriage 62 if it be so desired, the bottom of the casing is provided with a pair of standards 81 and 82 which may be folded into side by side relation, see dotted position Fig. 7, and Figs. 1, 4, and 5, wherein they are within the confines of the casing 10, or can be swung out to their supporting position, see full line position Fig. 7, wherein they will support the casing 10 on any flat surface. The standard 82 is pivoted at 83 to the under side of the bottom of the casing 10 to swing between the dotted position and the full line position.

The standard 81 is connected to standard 82 and to the casing 10 by link 84 which is pivoted at 85 to standard 81 and at 86 to standard 82. By virtue of this connection it will be readily understood that when standard 82 is swung to its extended position, full line position Fig. 7, the standard 81 will be automatically moved to its extended position. Each of standards 81 and 82 are provided with four feet 87 at the corners thereof, and these feet in combination with feet 88 on the rear edge of the casing 10 serve to support the casing whether it be supported on the supporting plate 71, or on a table top, not shown. The standards 81 and 82 are provided with cut out portions 89 and 90 which cooperate when the standards are in their folded positions to provide an aperture through which the attaching bolt 75 extends.

Referring now to Figs. 4, 5, and 6, one side of the casing 10 is provided with a hinged door 100 which when open, as shown, gives access to the film handling mechanism to be hereinafter described, and which when closed makes the casing light tight. The casing 10 is divided into two parts by a mechanism plate 101 which is fastened to lugs 102 in the casing 10 by means of bolts 103. On the front side of the mechanism plate 101 and located below the chamber 12 is a circular supply reel receptacle 104 in which a supply reel of film 105 is rotatably mounted on spindle 106. The end wall 16 of the chamber 12 extends downwardly to form a portion of the receptacle 104, as indicated at 107, so that in combination with the gate member 108 which also extends downwardly to form a part of the receptacle, a closed film path is formed directly from the receptacle past the exposure aperture 15. A circular cover, not shown, is provided for the receptacle 104 and is provided with a slot in the periphery thereof to accommodate the lower end of the film gate 108 and the portion 107 of the wall 13. The film gate member 108 is mounted in position on the mechanism plate 101 by resilient brackets 109 which serve to press the gate member 108 against the end wall 16 of the chamber 12 and to correctly position the film passing the exposure aperture 15 therein, and to permit the gate member to be sprung away from the wall 16 by pulling on the finger piece 110 fastened thereto to permit initial threading of a film through the gate. For indicating the amount of film on the supply reel, an oscillatable shaft 111 extending completely through the casing 10 and into the receptacle 104 is provided, said shaft having one projection 112 which normally engages the film F on the supply reel, and another projection parallel to and spaced from the projection 112, not shown, which is adapted to overhang the outside flange of the supply reel to prevent its accidental removal from the spindle 106 and to insure the reel being properly positioned on the spindle. The shaft 111 is acted on by a spring, not shown, which tends to oscillate it so that the projection 112 thereon will be normally held against the periphery of the coil of film on the supply reel, and the end of the shaft 111 extending toward the side of the casing opposite the door 100 may be suitably connected to a footage indicator, not shown, mounted on the wall of the casing whereby an oscillation of the shaft 111 caused by the film being used up will be visually recorded on said footage indicator. Footage indicators operating on this principle are well known in the art, and since it forms no part of the present invention, no more detailed showing of the same is deemed necessary.

A sprocket shaft 115 journaled in the side wall of the casing 10 and extending through and journaled in the mechanism plate 101 has a film sprocket 116 fixed to the end thereof. The film F passing through the gate is guided over a roller 117 mounted on the plate 101 and onto the sprocket 115. Associated with the sprocket 116 is the customary film guide member 118 which is pivoted to the mechanism plate at 119 to move to and from the sprocket. In the position shown in Fig. 4, the guide member 118 is in its retaining position wherein it holds the film on the sprocket. A spring pressed pin 120 on the guide member 118 is adapted to snap into holes in the mechanism plate to hold the guide member in either its threading or film retaining position, and when said pin enters hole 121 in the mechanism plate 101 the guide member will be held in its threading position.

On the mechanism plate 101 below the sprocket 115 is mounted a bracket 122 which is provided with a slot 123 through which the film strip is fed by the sprocket. Slidably mounted on the under side of the bracket 122 and to one side of the slot 123 therein by means of a pin and slot connection, indicated by 124, Fig. 6, is a knife 125 which is normally pulled away from the slot 123 by spring 126 one end of which is fastened to the knife while the other end thereof is connected to a U-shaped bracket 127 fixed to the mechanism plate 101. Rod 128 extending from the outside of the casing 10 and through the mechanism plate 101 has a downward turned end 129 which engages a slot 130 in the knife 125, and by turning the rod 128, by pressing on the handle 131 fixed to the end thereof and extending outside of the casing, the knife 125 can be moved across the slot 123 in the bracket 122 to cut the film strip passing therethrough.

A U-shaped treating tank 132 is removably mounted on the mechanism plate 101 by being slid onto pins 133 extending from said mechanism plate. This tank is adapted to hold a quantity of special film developing solution by means of which the exposed film can be processed in a short time, and the tank is made of a material which will not be affected by such developing solutions for instance, hard rubber, stainless steel, etc. The tank is removed from the pins 133 for filling or changing the solution therein, and is provided with a flat bottom 134 which permits of its being stood on a table top. The treating tank has an entrance beneath the knife 125 and an exit at the other end thereof, and the entrance and exit are connected by a single film path 135 which is formed by a pair of spaced ribs 136 on opposite walls of the tank, said ribs extending slightly from the walls of the tank to engage the film strip on both sides at its edges only. When the treating tank is slid onto the pins 133 the entrance to the tank is directly below the slot 123 in the bracket 122 so that the film strip passing from the sprocket after being cut by the knife may pass directly thereinto without being directed by hand. The entrance and exit of the tank 132 are exactly alike so that it makes no difference which side of the tank is placed toward the mechanism plate, and the ribs 136 adjacent the entrance and exit are flared outwardly to facilitate the introduction of the film into the tank. It will be noticed that there are no film feeding means in the tank, but that the film is fed into and through the tank by the sprocket 116, the film being supported at its edges in the tank lending sufficient rigidity thereto to make this possible.

Adjacent the exit of the treating tank 132 are a pair of film gripping rollers 137 and 138 in rolling contact, their line of contact being in vertical alignment with the exit of the tank so that a film emerging therefrom will pass between the rollers. Roller 137 is connected with a drive shaft 139 which extends through the side of the casing, the mechanism plate 101, and the U-shaped bracket 127. The other roller 138 is rotatably mounted on a stub shaft 140 extending between the mechanism plate 101 and the U-shaped bracket 127. The rollers 137 and 138 are rubber covered so that when roller 137 is driven, by means hereinafter described, roller 138 will be driven therefrom so as to grip and feed a film strip emerging from the treating tank. Directly above the line of contact and the rollers 138 and 137 is a chute 141 through which the treated film strip is fed to the outside of the casing 10.

Connected to the end of the drive shaft 139 outside of the casing 10 is a crank 142 by means of which manual control of the gripping rollers 137 and 138 can be had. This crank mechanism is of a well known type wherein the crank can be disconnected from the shaft to permit the shaft to rotate relative to the crank, or wherewith the crank can be pivoted into engagement with the shaft to maintain control thereof. A pivot member 143 is rotatably mounted on the drive shaft 139 behind the square end 144 thereof. Pivoted at 145 to the pivot member is the crank 142 which has a square aperture therein which is adapted to engage the square end of the drive shaft when the crank is pivoted about the pivot 145, while in the inoperative position of the crank, the handle 146 thereof passes into and is resiliently held in a recess 147 in the wall of the casing 10, see Fig. 6.

The chain sprocket 148 is connected to the drive shaft 139 by a conventional one-way clutch mechanism 149 so that rotation of said drive shaft by the crank 142 is not transmitted to the sprocket. Another chain sprocket 150 is fixed to the sprocket shaft 115 between the wall of the casing 10 and the mechanism plate 101, and still another chain sprocket 151 is fastened to the drive shaft of the motor 152, see Figs. 5 and 6. A chain 153 running over sprockets 152, 151, and 148 drives the film sprocket 116 and the film gripping rollers 137 and 138 in unison and at the same speed. Lever 154 pivoted to the mechanism plate at 155 has a sprocket 156 mounted on one end thereof in engagement with the chain, while the other end of the lever extends below the mechanism plate so that it can be gripped by the operator from the film feeding side of the mechanism plate to adjust the tension in the chain. A screw 157 extending through an arcuate slot 158 in the mechanism plate and into the lever 154 has a head whose diameter is greater than the width of the arcuate slot so that by tightening the screw against the plate the lever 154 can be held in any position of adjustment.

The motor 152 is controlled by a normally opened microswitch 158 mounted on the rear side of the mechanism plate 101. Extending through an opening 159 in the top of the casing 10 is a lever 160 which is pivoted at 161 to the end of another lever 162 pivoted at 163 to the rear side of the mechanism plate 101, the combination of these two levers constituting the actuating mechanism for the switch 158. Attached to the lever 162 is a spring contact member 164 which is adapted to engage the contact 165 on the switch 158 to close the same when the lever 160 is pressed downward. The contact member 164 is made in the form of a spring to serve two purposes, one to allow lost motion between the movement of the levers 160 and 162 and the switch contact 165 so that undue force on the levers will not rupture the contact, and secondly to tend to normally force the levers 160 and 162 into their switch releasing positions.

Referring to Fig. 5, one end of the lever 162 is connected to the pivoted mirror 50 by means of a link 166 one end of which is pivoted to the mirror while the other end thereof is pivoted to the lever 162. The rear side wall of the chamber 12 is provided with a slot 167 through which the pivot between the mirror and the link 166 extends, said slot being of a length to permit the mirror 50 to be moved between its reflecting position wherein it reflects the light beams from the lens tubes 32 to the ground glass 52, and its unobstructing position wherein it permits the light beams to pass through the exposure aperture 15 when the actuating mechanism comprising levers 160 and 162 is moved from its normal switch open or "stop" position to its switch closing or "start" position respectively. In Fig. 5 the normal "stop" position of the actuating mechanism and its associated parts is indicated in full lines, while the broken line position of the actuating mechanism indicates the position of the parts when they are in their "start" position. The actuating mechanism is normally held in its "stop" position by the combined effect of the weight of the mirror 50 tending to assume its reflecting position, the action of the spring contact member 164 on the lever 162, and the action of the switch contact 165 which is normally forced to its open position.

In order that after the apparatus is once started it will continue to operate and feed a length of film which will extend through the treating tank 132, between the gripping rollers 137 and 138, and just extend through the chute 141 so that it can be gripped by the operator, after which it is automatically stopped, the following timing mechanism is provided. A gear cam 170 rotatably mounted on the rear side of the mechanism plate 101 and having a cam face 171 in the periphery of which there is a notch 172 is driven from the sprocket shaft 115 by a gear 173 fixed thereto. Lever 162 has a nose-shaped end 174 which is adapted to snap into the notch 172 when the actuating mechanism is in its "stop" position, said notch permitting the lever 162 to move away from the switch 158 to permit the spring contact member 164 thereon to release the switch contact 165, see full line position of Fig. 5. When the lever 160 is depressed, the nose 174 is removed from the notch 172, and the switch 158 is closed starting the motor whereupon the gear 170 starts to rotate removing the notch 172 from the position wherein it is engaged by the nose 174. Since the nose 174 cannot enter the notch 172 it engages and rides on the cam surface 171 which holds the actuating mechanism in its switch closing position until the cam surface 171 completes one revolution and the notch 172 therein is returned to its original position wherein the nose 174 snaps thereinto to stop the motor. The ratio of the gearing between the gears 170 and 173 along with the circumference of the cam face 171 are computed so that the time which the actuating mechanism, including levers 160 and 162, is held in its "start" position is sufficient to feed a given length of film from the film sprocket 116, through the treating tank 132, between the gripping rollers 137 and 138, and just out of the chute 141. This length of film constitutes a single individual record, and after the apparatus is stopped, the film is severed at the entrance of the treating tank by actuating knife 125, and said severed film is allowed to remain in the tank 122 for the required length of time, a few minutes, after which the strip is removed from the tank manually by driving the gripping rollers 137 and 138 independently of the chain 153 by means of a crank 142. After the tank is thus emptied, the procedure is repeated with another subject.

So that a plurality of records can be made one after another on a single film strip which is to be gathered for future development, the following structure is provided. A takeup shaft 175 extends through and is rotatably mounted in the mechanism plate 101. The end of this takeup shaft which is to receive a takeup reel extends through the side of the mechanism plate on which the feeding tank 132 is mounted, and on the other end of the shaft is fixed a pulley 176 which is driven from a pulley 177 fixed to the sprocket shaft 115 by means of a belt 178. In the event that a long film strip containing a plurality of records is to be made, the treating tank 132 is slid off the pins 133 on the mechanism plate 101 and a takeup reel T is placed on the takeup shaft. The film after passing from the sprocket 116 through the slot 123 in the bracket 122 is taken up on said reel to be processed in a dark room at a future time.

So that the timing mechanism can be disconnected from the actuating mechanism to permit a record of longer length than provided by said timing mechanism, and primarily when the film strip is being taken up on a takeup reel instead of passing through the treating tank, a catch member, indicated broadly as 180, is mounted atop the casing 10 to engage and hold the lever 160 in its start-position. Referring to Figs. 5 and 8, this catch member 180 includes a tubular nut member 181 which is in threaded engagement with the opening 159 in the top wall of the casing 10 and through which the lever 160 extends. The inner periphery of this tubular nut member 181 is provided with a catch portion 182 which projects into the opening in the nut member to be engaged in one position of the nut member, see Fig. 5, by a notch 183 in one edge of the lever 160, whereby the lever is held in its depressed position to prevent the nose 174 on the lever 162 from snapping into the notch 172 in the cam face 171 to stop the machine. The lever 160 when depressed to its "start" position is pivoted about 161 to engage the catch portion 182 or is moved about said pivot to disengage the notch from said catch portion. When the nut member 180 is rotated by means of a handle 184 fixed thereto to its ineffective position, shown in Fig. 8, determined by one of the spaced pins 185 fastened to and extending above the top of the casing 10, the catch portion 182 thereon is moved from the position indicated in Fig. 5 to the one indicated in Fig. 8 wherein it cannot be engaged by the notch 183 in the lever 160. Having the catch member 180 rotatable between a position wherein it can be engaged by the notch 183 in the lever 160 and a position wherein it cannot be engaged by the notch, prevents the timing mechanism from being accidentally disconnected from the actuating mechanism when given length records are to be made.

Means for identifying the individual record includes a compartment 186 formed in one corner of the chamber 12 by a partition 187. The end wall 16 of the chamber 12 forms one wall of the compartment 186, and in this end wall 16 just above the exposure opening 15 is formed an identification opening 188 past which the film strip is fed when passing through the gate 108. In the compartment 186 is located a printing lamp 189 which is controlled by a normally opened micro-switch 190. This switch is closed by pressing a button 191 extending through the top of the casing 10, said lever depressing a spring member 192 which in turn depresses the contact on the switch. When a printed card bearing the person's name and any other details required is inserted into the slot 193 in the top of the casing 10 it is directed downwardly between the film in the gate and the identification opening 188. If the printing matter on the card is against the film strip in the gate and the printing lamp is turned on by depressing the button 191, a contact print of the printing on the card will be made on the film strip which after treatment will serve to identify the individual record as to the person examined. The slot 193 should have vertical walls 195 for directing the card properly between the film and the identification opening 188, and the slot 193 should be made light tight by some suitable means, as for example by using strips of plush or the like, to prevent light from entering the casing to fog the film strip passing therethrough. It will be readily understood that the printing of the identification material on the film has to be done while the film strip is stationary, and to insure that the printing lamp 189 cannot be turned on accidentally while a record is being made, said lamp can be so connected in the circuit of the machine that it cannot be turned on while the motor is running.

The film handling apparatus above described operates in the following manner. First let us assume that it is desired to make an individual record of a person's eyes, and treat the same so that the record can be examined while the person waits. For this procedure the apparatus will include the parts shown in Figs. 4 and 5, and a leader on the film strip F is initially threaded from the supply reel 105, through the gate 108, over the sprocket 116, and through the slot 123 in the bracket 122 after which the door 100 of the casing 10 is closed. The lever 160 is depressed to close the switch 158 whereupon the motor 152 is started and drives the film sprocket and the film gripping rollers 137 and 138. The mechanism will continue to operate until the nose 174 on the lever 162 snaps back into the notch 172 in the cam face 171 on the cam 170 whereupon the lever 160 will snap into its "stop" position, and the film feed will be stopped. During this operation, enough film has been fed so that the end emerging from the treating tank 132 will have been gripped by the gripping rollers 137 and 138. The knife 125 is actuated to cut the film at the entrance of the treating tank, and the rollers 137 and 138 are rotated by means of crank 142 to pull the severed portion of the film and leader from the tank. This first operation is performed to get rid of the leader strip and any portion of the film strip which might have been fogged during the threading operation, and is necessary only when a new roll of film is placed in the machine.

After the machine has been threaded, and the light beams reflected from the pupils of the subject's eyes have been properly focused and located on the ground glass 52 to insure their proper registry on the film passing the exposure aperture 15, the apparatus is ready for operation. The first step comprises slipping an identification card in the slot 193 and turning on the printing lamp 189 to print the identification material at the beginning of the record. After this is done the lever 160 is depressed to its "start" position wherein it closes the motor switch 158 to start the motor 152. This starts the film sprocket 116 which feeds the film strip continuously into and through the treating tank 132 at the exit of which the film is gripped by rollers 138 and 137 driven from the motor in unison with the sprocket. By the time the end of the film strip has passed through the rollers 137 and 138 and just extends out of the chute 141, the notch 172 of the cam 170 has made one complete revolution and allows the nose 174 on the lever 162 to snap back thereinto whereupon the lever 160 can return to its "stop" position. It should be noticed that when the lever 160 is depressed to start the apparatus, the mirror 50 is pivoted out of the path of the light beams to permit them to pass through the exposure aperture 15 and onto the film strip F. After the apparatus stops, the knife 125 is actuated to cut the film at the entrance of the treating tank 132, and the severed film strip is allowed to remain in the tank for a short period of time depending upon the nature of the treating solution contained in the tank. After the film has remained in the tank for a sufficiently long time, say 6 minutes, it is removed therefrom by turning the rollers 137 and 138 by means of crank 142, and the film is ready for examination. It will be readily appreciated that the apparatus is adapted to take record after record until the film is exhausted without requiring a rethreading, because the film is severed behind the feed sprocket 116 and the severed end thereof is below the slot 123 in the bracket 122, said slot tending to direct the film into the entrance of the tank.

If it be desired to take a plurality of individual records without processing them immediately, the treating tank 132 can be removed from the casing 10 and a takeup reel T can be positioned on the takeup shaft driven from the sprocket 115. In this procedure the full takeup reel is removed to a dark room for processing, and the individual records can be properly identified by the material printed thereon at the identification opening 188 as above described.

Should it be found desirable to make individual records varying in length, catch member 180 atop the casing 10 can be rotated to its operative position, Fig. 5, wherein it engages and holds the lever 160 in its depressed position so that the timing cam 171 has no control thereover.

Although I have shown and described certain specific embodiments of my invention, I am fully aware that many modifications thereof are possible. My invention, therefore, is not to be restricted except in so far as is necessitated by the prior art and by the spirit of the appended claims.

Having thus described my invention, what I claim as new and desire to secure by Letters Patent of the United States is:

1. In an apparatus of the type described, the combination of a casing having an exposure aperture through which rays of light directed theretoward are adapted to pass, a treating tank in said casing having an entrance and an exit, means for feeding a film strip past said exposure aperture and into said treating tank, means located adjacent the entrance of the treating tank for cutting the film strip entering thereinto, and means adjacent the exit of the tank for gripping and pulling the film strip from the tank after it has been cut.

2. In an apparatus of the type described, the combination of a casing having an exposure aperture through which rays of light directed theretoward are adapted to pass, a treating tank in said casing having an entrance and an exit, a supply reel of film rotatably mounted in said casing, means for feeding the film strip from the supply reel past the exposure aperture and through the treating tank, film gripping means located adjacent the exit of said tank adapted to grip the film strip as it emerges from the tank, film severing means located adjacent the entrance of the tank, and manually operable means for driving the film gripping means whereby the film strip can be pulled out of the film tank after it has been severed.

3. In an apparatus of the type described, the combination of a casing having an exposure aperture through which rays of light directed theretoward are adapted to pass, a treating tank in said casing having an entrance and an exit, means for feeding a film strip past the exposure aperture and through said treating tank, film gripping means located adjacent the exit of the treating tank and adapted to grip the film strip as it emerges from the treating tank, film severing means located adjacent the entrance to the treating tank, and means for disconnecting the film gripping means from the power drive and assuming manual control thereof to pull the film strip from the treating tank after it has been severed.

4. In an apparatus of the type described, the combination of a casing having an exposure aperture through which rays of light directed theretoward are adapted to pass, a treating tank in said casing having an entrance and an exit, means for feeding a film strip past the exposure opening and through said treating tank, film gripping means located adjacent the exit of the treating tank and adapted to grip the film strip as it emerges from the tank, a common power drive for said film feeding means and said film gripping means, means for starting said power drive, a timing mechanism associated with said power drive and adapted to stop said power drive after a given length of film has been fed into the treating tank, film severing means located adjacent the entrance to said treating tank for cutting the film entering thereinto, and means for disconnecting the film gripping means from the power drive and assuming manual control thereof to pull the severed film strip from the treating tank.

5. In an apparatus of the type described, the combination of a casing having an exposure aperture through which rays of light directed theretoward are adapted to pass, a treating tank in said casing having an entrance and an exit, means for feeding a film strip past the exposure aperture and through said treating tank, film gripping means located adjacent the exit of the treating tank and adapted to grip the film strip as it emerges from the tank, a common power drive for said film feeding means and said film gripping means, a control lever movably mounted in the casing to move between a "start" position wherein it starts the power drive and a "stop" position wherein it stops the power drive, a timing mechanism associated with said power drive and adapted to engage and hold said control lever in its "start" position until a given length of film has been fed into the treating tank after which the lever automatically returns to its "stop" position, film severing means located adjacent the entrance to said treating tank for cutting the film entering thereinto, and means for disconnecting the film gripping means from the power drive and assuming manual control thereof to pull the severed film strip from the treating tank.

6. In an apparatus of the type described, the combination of a casing having an exposure aperture through which rays of light directed theretoward are adapted to pass, a treating tank in said casing having an entrance and an exit, means for feeding a film strip past the exposure aperture and through said treating tank, film gripping means located adjacent the exit of the treating tank and adapted to grip the film strip as it emerges from the tank, a common power drive for said film feeding means and said film gripping means, a control lever movably mounted in the casing to move between a "start" position wherein it starts the power drive and a "stop" position wherein it stops the power drive, means for normally holding the control lever in its "stop" position, a cam member driven from the film feeding means and adapted to engage and hold the control lever in its "start" position until a given length of film is fed into the treating tank after which the control lever is allowed to return to its "stop" position, film severing means located adjacent the entrance of the treating tank for cutting the film strip entering thereinto, and means for disconnecting the film gripping means from the power drive and assuming manual control thereof to pull the severed film from the treating tank.

7. In an apparatus of the type described, the combination of a casing having an exposure aperture through which rays of light directed theretoward are adapted to pass, a treating tank in said casing having an entrance and an exit, a film sprocket for feeding a film strip past the exposure aperture and through the treating tank, film gripping means located adjacent the exit of the treating tank to grip the film strip at it emerges therefrom, said means including a pair of rollers in rolling contact, a motor connected to said film sprocket and said film gripping means to drive the same in unison whereby the film gripping means assume control of the film strip as it emerges from the treating tank, a switch for controlling the operation of said motor, a control lever mounted in said casing to move between two positions, a "start" position wherein it closes the switch, and a "stop" position wherein it opens the switch, a cam member driven in timed relation with the film sprocket and adapted to engage and hold the control lever in its "start" position until a given length of film is fed into the treating tank after which it permits the control lever to move to its "start" position, film severing means located adjacent the entrance to the treating tank for cutting the film entering the same, and means for disconnecting the film gripping means from the motor and assuming manual control thereof to pull the severed film strip from the treating tank.

8. In an apparatus of the type described, the combination of a casing having an exposure aperture through which rays of light directed theretoward are adapted to pass, a treating tank removably mounted in the casing and having an entrance and an exit, a supply roll of film in the casing, a continuously driven sprocket for feeding the film strip past the exposure aperture and through the treating tank, a pair of film gripping rollers located adjacent the exit of the treating tank and adapted to grip the film strip as it emerges therefrom, a motor operatively connected to the sprocket and the film gripping rollers to drive the same in unison and at the same speed, a normally open switch for said motor, a control lever movably mounted in said casing for closing said switch, a timing mechanism operatively connected to the sprocket and adapted to engage and maintain said control lever in switch closing position until a given length of film has been fed into the treating tank after which the control lever is allowed to return to its normal position to open the switch, film severing means located adjacent the entrance of the treating tank to cut the film entering thereunto, and means for disconnecting the film gripping rollers from the motor to assume manual control thereof for pulling the severed film strip from the treating tank, said means including a shaft connected to one of said rollers and extending outside of the casing, a hand crank on said shaft, and an over-running clutch between said shaft and the motor.

9. In an apparatus of the type described, the combination of a casing having an exposure aperture through which rays of light directed theretoward are adapted to pass, a treating tank removably mounted in the casing and having an entrance and an exit, a supply roll of film in the casing, a continuously driven sprocket for feeding the film strip past the exposure aperture and through the treating tank, a pair of film gripping rollers located adjacent the exit of the treating tank and adapted to grip the film strip as it emerges therefrom, a motor, a chain drive connecting said sprocket, gripping rollers and motor whereby the sprocket and the gripping rollers are operated in unison and at the same speed, a normally open switch for controlling the operation of said motor, an actuating mechanism movably mounted in said casing to close said switch and start the motor, means for maintaining said switch closed until a given length of film has been fed into the treating tank after which the switch is allowed to open, said means including a rotating cam member geared to the sprocket which is adapted to engage and hold the actuating mechanism in switch closing position for a predetermined interval of time, after which it moves said actuating mechanism to its switch open position, film severing means located adjacent the entrance to the treating tank for cutting the film entering thereinto, and manually operated means operatively connected to the film gripping rollers for pulling the severed film strip from the treating tank, the drive between the gripping rollers, the chain, and the manually operated means including a clutch permitting one of said driving means to drive the film gripping rollers, independently of the other.

10. In an apparatus of the type described, the combination of a casing having an exposure aperture through which rays of light directed theretoward are adapted to pass, a treating tank removably mounted in the casing and having an entrance and an exit, a supply roll of film in the casing, a continuously driven sprocket for feeding the film strip past the exposure aperture and through the treating tank, a pair of film gripping rollers located adjacent the exit of the treating tank and adapted to grip the film strip as it emerges therefrom, a motor operatively connected to the sprocket and the film gripping rollers to drive the same in unison and at the same speed, a normally open switch for said motor, an actuating mechanism mounted in said casing to move between two positions, a "start" position wherein it permits the switch to open, and a "stop" position wherein it closes the switch, means for normally holding the actuating mechanism in its "stop" position, means for maintaining said switch closed until a given length of film has been fed into the treating tank after which the switch is allowed to open, said means including a rotating cam member geared to the sprocket and adapted to engage and hold said actuating mechanism in its "start" position for a predetermined rotation of the cam member, said cam member having a notch into which the actuating mechanism is permitted to move to its "stop" position, a film severing means located adjacent the entrance to the treating tank for cutting the film entering thereinto, and manually operated means operatively connected to the film gripping rollers for pulling the severed film strip from the treating tank, the drive between the gripping rollers, the chain, and said manually operated means including a clutch permitting one of said driving means to drive the film gripping rollers independently of the other.

11. In an apparatus of the type described, the combination of a casing having an exposure aperture through which rays of light directed theretoward are adapted to pass, a treating tank removably mounted in said casing and having an entrance and an exit, film guiding means in said tank forming a film path from the entrance to the exit thereof, a supply reel of film rotatably mounted in said casing, a single continuously driven sprocket for feeding the film strip past the exposure opening and through the treating tank, film gripping rollers located adjacent the exit of the tank to grip and assume control of the film strip as it emerges from the tank, film severing means located adjacent the entrance to the treating tank for cutting the film entering thereinto, and means for manually operating said film gripping rollers to pull the severed film strip from the treating tank.

12. In an apparatus of the type described, the combination of a casing having an exposure aperture through which rays of light directed theretoward are adapted to pass, a treating tank in said casing having an entrance and an exit, means for feeding a film strip past the exposure aperture and through said treating tank, film gripping means located adjacent the exit of the treating tank and adapted to grip the film strip as it emerges from the tank, a common power drive for said film feeding means and said film gripping means, a control means movably mounted in the casing to move between a "start" position wherein it starts the power drive and a "stop" position wherein it stops the power drive, a timing mechanism associated with said power drive and adapted to engage and hold said control means in its "start" position until a given length of film has been fed into the treating tank, after which the control means automatically returns to its "stop" position, means for holding the control means in its "start" position irrespective of the timing mechanism for continuous operation, film severing means located adjacent the entrance to said treating tank for cutting the film entering thereinto, and means for disconnecting the film gripping means from the power drive and assuming manual control thereof to pull the severed film from the treating tank.

13. In an apparatus of the type described, the combination of a casing having an exposure aperture through which rays of light directed theretoward are adapted to pass, a treating tank in said casing having an entrance and an exit, a film sprocket for feeding a film strip past the exposure aperture and through the treating tank, film gripping means located adjacent the exit of the treating tank to grip the film strip as it emerges therefrom, said means including a pair of rollers in rolling contact, a motor connected to said film sprocket and said film gripping means to drive the same in unison whereby the film gripping means assume control of the film strip as it emerges from the treating tank, a switch for controlling operation of said motor, a control means mounted in said casing to move between two positions, a "start" position wherein it closes the switch, and a "stop" position wherein it opens the switch, a cam member driven in timed relation with the film sprocket and adapted to engage and hold the control means in its "start" position until a given length of film is fed into the treating tank after which it permits the control means to move to its "start" position, means for holding the control means in its "start" position irrespective of the cam member for continuous operation, and comprising a catch member adapted to be engaged by said control means when the latter is in its "start" position, said catch member being movably mounted on the casing so as to be moved into or out of the path of the control means, film severing means located adjacent the entrance to the treating tank for cutting the film entering the same and means for disconnecting the film gripping means from the motor and assuming manual control thereof to pull the severed film strip from the treating tank.

14. In an apparatus of the type described, the combination of a casing having a light admitting opening, a treating tank mounted in said casing and having an entrance and an exit, guiding means in said tank between the entrance and exit thereof adapted to engage the margins of a film strip to direct the same through said tank, a film feeding means adapted to feed a film strip past the light admitting opening and through the treating tank, cooperating gripping rollers adjacent the exit of said tank for gripping the end of the strip emerging from the tank, a common drive for said film feeding means and said gripping rollers, means for automatically stopping said drive when a sufficient length of film has been fed through said treating tank to be gripped by said gripping rollers, means for cutting the film strip adjacent the entrance to said treating tank, and means for manually operating said gripping rollers independently of film feeding means to pull the severed film strip from the treating tank.

CARTER J. HUGHEY.